(12) United States Patent
Bechtold et al.

(10) Patent No.: US 12,317,910 B2
(45) Date of Patent: Jun. 3, 2025

(54) SHELF-STABLE FOOD COMPOSITION

(71) Applicant: General Mills, Inc., Minneapolis, MN (US)

(72) Inventors: Roy Bechtold, St. Louis Park, MN (US); Rachel Beck, St. Louis Park, MN (US); Michael Li, St. Louis Park, MN (US); Emily Rotvold, Eden Prairie, MN (US)

(73) Assignee: General Mills, Inc., Minneapolis, MN (US)

( * ) Notice: Subject to any disclaimer, the term of this patent is extended or adjusted under 35 U.S.C. 154(b) by 58 days.

(21) Appl. No.: 17/356,705

(22) Filed: Jun. 24, 2021

(65) Prior Publication Data

US 2021/0401012 A1 Dec. 30, 2021

Related U.S. Application Data

(60) Provisional application No. 63/043,202, filed on Jun. 24, 2020.

(51) Int. Cl.
*A23L 29/30* (2016.01)
*A23L 25/00* (2016.01)
(Continued)

(52) U.S. Cl.
CPC .............. *A23L 25/10* (2016.08); *A23L 25/30* (2016.08); *A23L 29/212* (2016.08); *A23L 29/30* (2016.08); *A23L 33/115* (2016.08); *A23L 33/19* (2016.08)

(58) Field of Classification Search
CPC .......... A23L 25/10; A23L 25/30; A23L 29/30; A23L 33/115; A23G 3/54
See application file for complete search history.

(56) References Cited

U.S. PATENT DOCUMENTS 5,433,970 A * 7/1995 Wong ...................... A23L 25/30
426/519
7,727,566 B2 6/2010 Rapp et al.
(Continued)

FOREIGN PATENT DOCUMENTS

CN 2558537 9/2005
CN 101375716 3/2009
(Continued)

OTHER PUBLICATIONS

Fuentes et al., "Fractionation and characterization of starch granules using field-flow fractionation(FFF) and differential scanning calorimetry (DSC)", Anal Bioanal Chem. 2019; 411(16): 3665-3674. (Year: 2019).*

(Continued)

*Primary Examiner* — Elizabeth Gwartney
*Assistant Examiner* — Andrew E Merriam
(74) *Attorney, Agent, or Firm* — Jordan IP Law, LLC; Rachel A. Kahler

(57) ABSTRACT

Described is a shelf stable food composition that includes a novel continuous component that incorporates a nut butter as a major ingredient. A continuous component includes a nut butter, a structuring fat, a syrup, and added micro-particulates, and remains surprisingly stable over a room temperature shelf life. In some cases, a shelf stable food composition can also include a macro-particulate component in an amount of up to 60% by weight of the food composition. Methods of making a shelf stable food composition are also described.

19 Claims, 2 Drawing Sheets

(51) Int. Cl.
*A23L 25/10* (2016.01)
*A23L 29/212* (2016.01)
*A23L 33/115* (2016.01)
*A23L 33/19* (2016.01)

(56) References Cited

U.S. PATENT DOCUMENTS

| | | | |
|---|---|---|---|
| 8,110,231 | B2 | 2/2012 | Coleman et al. |
| 2002/0051837 | A1* | 5/2002 | Beharry .................. A23L 25/10 |
| | | | 426/94 |
| 2006/0088628 | A1 | 4/2006 | Dekker et al. |
| 2006/0188644 | A1 | 8/2006 | Sault et al. |
| 2008/0050475 | A1 | 2/2008 | Garter et al. |
| 2011/0003062 | A1* | 1/2011 | Kennedy ............... A23L 33/185 |
| | | | 426/633 |
| 2011/0172142 | A1 | 7/2011 | Smith et al. |
| 2015/0072046 | A1 | 3/2015 | Aftoora |
| 2017/0245539 | A1 | 8/2017 | Do et al. |
| 2018/0235244 | A1 | 8/2018 | Nielsen |
| 2020/0146320 | A1 | 5/2020 | Longo |
| 2021/0244056 | A1* | 8/2021 | Brown .................... A23L 25/30 |

FOREIGN PATENT DOCUMENTS

| | | |
|---|---|---|
| CN | 101375719 | 3/2009 |
| CN | 101401606 | 4/2009 |
| CN | 101455370 | 6/2009 |
| CN | 101524154 | 9/2009 |
| CN | 101627824 | 1/2010 |
| CN | 102106501 | 6/2011 |
| CN | 102630864 | 8/2012 |
| CN | 104522644 | 4/2015 |
| CN | 106616970 | 5/2017 |
| CN | 107149142 | 9/2017 |
| CN | 107485027 | 12/2017 |
| CN | 108260805 | 7/2018 |
| CN | 108308598 | 7/2018 |
| CN | 109288010 | 2/2019 |
| CN | 109567024 | 4/2019 |
| WO | WO-0051449 A1 * | 9/2000 ............. A23L 25/10 |
| WO | WO 2014/047493 | 3/2014 |
| WO | WO 2018/236365 | 12/2018 |
| WO | WO-2019224299 A1 * | 11/2019 ............. A23K 10/30 |

OTHER PUBLICATIONS

Haynes, ed. CRC Handbook of Chemistry and Physics, 96th Edition, "Composition and Properties of Common Oils and Fats" at 7-15, CRC Press LLC, 2016 (Year: 2016).*

* cited by examiner

SHELF-STABLE FOOD COMPOSITION

CROSS REFERENCE TO RELATED APPLICATIONS

This application claims the benefit of U.S. Provisional Patent Application Ser. No. 63/043,202, which was filed on Jun. 24, 2020 and titled "Shelf-Stable Food Composition". The entire content of this application is incorporated by reference.

BACKGROUND

People enjoy having a variety of foods to choose from and experience. Shelf stable foods provide a convenient way to enjoy foods during eating occasions that are less conducive to a sit-down meal. Although consumers enjoy nut butters as an ingredient in shelf stable foods, the ways in which nut butter is integrated into such convenient foods is limited in current products. More variety in the use of nut butters in shelf stable foods is desired.

SUMMARY

The present disclosure relates to a shelf-stable food composition including a nut butter-based continuous phase.

Provided herein is a shelf-stable food composition. A shelf stable food composition includes a continuous component in an amount of at least 40% by weight of the shelf-stable food composition, and, optionally, a macro-particulate component in an amount of up to 60% by weight of the food composition, where the macro-particulate component is suspended within the continuous component. A continuous phase of a shelf stable food composition includes a nut butter in an amount of about 20% to about 50% by weight of the continuous component, a structuring fat in an amount of about 2% to about 35% by weight of the continuous component, a syrup in an amount of about 15% to about 45% by weight of the continuous component, and added micro-particulates in an amount of about 3% to about 25% by weight of the continuous component, at least 90% of the added micro-particulates having a particle size of less than 150 µm.

In some embodiments, a continuous component can be included in an amount of 40% to 70% by weight of the shelf-stable food, and the macro-particulate component can be included in an amount of 30% to 60% by weight of the shelf-stable food composition.

In some embodiments a nut butter can be included in a continuous component in an amount of about 30% to about 45% by weight of the continuous component.

In some embodiments, a structuring fat can include a liquid oil in an amount of up to 50% by weight of the structuring fat.

In some embodiments, a continuous component can have a total fat content of no higher than 30% by weight of the continuous component, where the total fat content includes the structuring fat and a nut butter fat content.

In some embodiments, added micro-particulates in a continuous component can include a protein, a flour, and/or a starch. In some embodiments, the added micro-particulates can include a caseinate protein or a whey protein.

In some embodiments, a syrup in a continuous component can include glycerol, allulose, honey, and/or tapioca syrup.

In some embodiments, a shelf-stable food composition can further include a fat-based or sugar-based coating.

In some embodiments, a shelf-stable food composition can be a snack bar.

Also provided herein is a packaged food product, including a shelf-stable food composition disclosed herein inside a package.

A method of making a shelf-stable food composition is also provided. A method of making a shelf-stable food composition includes combining ingredients to produce a continuous component, where the ingredients include a nut butter in an amount of about 20% to about 50% by weight of the continuous component, a structuring fat in an amount of about 2% to about 25% by weight of the continuous product, a syrup in an amount of about 15% to about 45% by weight of the continuous component, and added micro-particulates in an amount of about 3% to about 10% by weight of the continuous component, at least 90% of the added micro-particulates having a particle size of less than 150 µm; and applying sufficient shear to the ingredients to homogeneously integrate each of the ingredients into the continuous component to make the shelf-stable food composition.

In some embodiments of a method of making a shelf-stable food composition, ingredients can be combined in a batch process. In some embodiments of a batch process, the added micro-particulates can be combined with a macro-particulate component prior to adding the nut butter, the structuring fat, and the syrup.

In some embodiments of a method of making a shelf-stable food composition, ingredients can be combined in a continuous process. In some embodiments of a continuous process, the added micro-particulates can be combined with the nut butter and the structuring fat prior to adding the syrup.

In some embodiments of a method of making a shelf-stable food composition, the method can further include combining the ingredients with a macro-particulate component.

In some embodiments of a method of making a shelf-stable food composition, the method can further include melting the structuring fat prior to combining the ingredients.

In some embodiments of a method of making a shelf-stable food composition, the method can further include maintaining the ingredients at a temperature at or above a melting point of the structuring fat during the steps of combining the ingredients and applying shear.

In some embodiments of a method of making a shelf-stable food composition, the method can further include forming the shelf-stable food composition into pieces. In some embodiments, a method can further include packaging the pieces to produce a packaged food product.

These and various other features and advantages will be apparent from a reading of the following detailed description.

DETAILED DESCRIPTION

Figure 1:
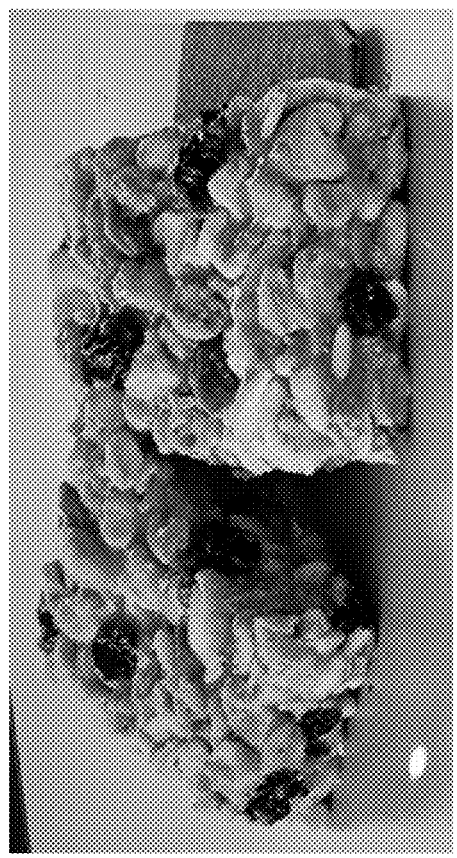
FIG. 1 shows peanut butter-(left) and almond butter-based (right) shelf stable food compositions as described in Example 1.
Figure 1:
Figure 2:
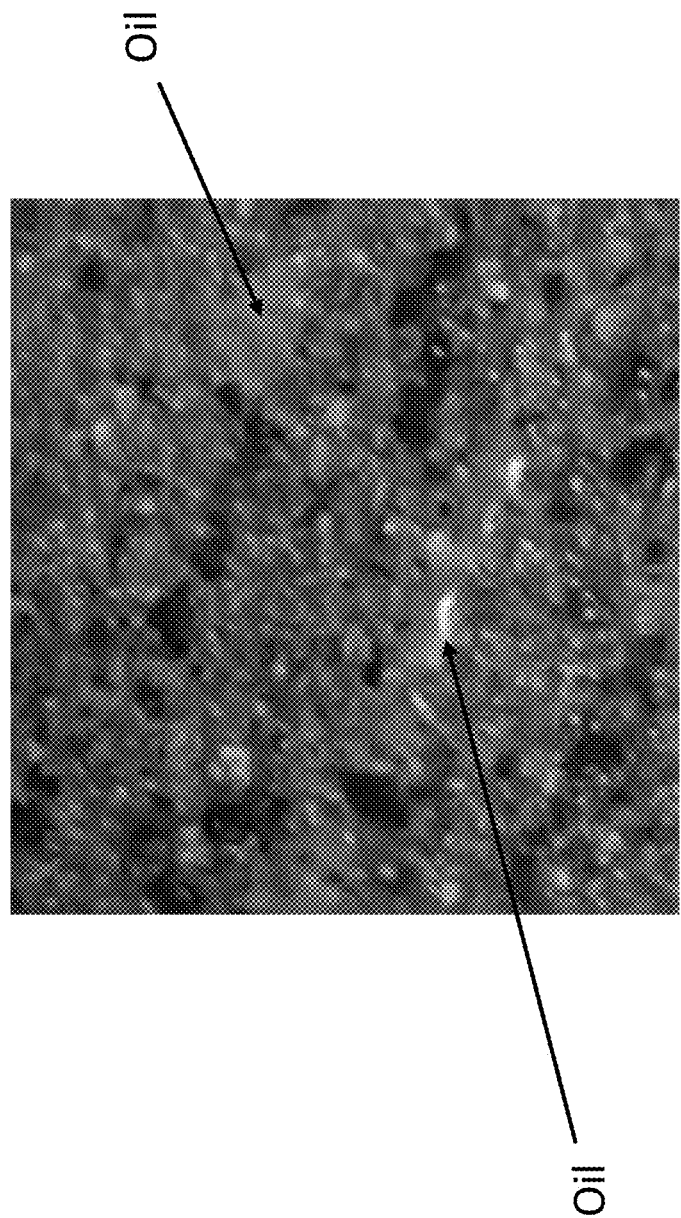
FIG. 2 shows a composition in which excessive shear has been applied, exhibiting separation of oil from the other ingredients in a continuous component, and agglomeration of the other ingredients that are resistant to re-integration. Arrows identify puddled oil on the surface of the composition.

Consumers enjoy novel eating experiences, and often look for convenient foods to fulfill this desire. Nut butters are an ingredient that many consumers enjoy due to the flavor and, at least in part, to the unique texture of nut butters. However, nut butters used in shelf stable foods often fail to deliver the desired texture even if they provide nut butter flavor. In addition, nut butter ingredients in shelf stable foods are included in a limited number of ways, often as fillings, layers, or toppings. This application describes a unique, shelf stable food in which nut butters can be used as a major ingredient that forms a continuous component with a structure that can be used alone or surprisingly act as a binder to hold macro-particulates together.

It was discovered, and is described herein, that a particular combination of ingredients, including a nut butter, a structuring fat, a syrup, and added micro-particulates, can be combined to produce a shelf stable continuous component with a creamy and pliable texture. As used herein, a "continuous component" refers to a food component that is homogeneous in appearance, with substantially no dry spots or oil separation visible to the naked eye, and remains pliable over shelf life at room temperature. Without being bound by theory, it is believed that the described continuous component derives its surprising stability and binding capacity by development of a capillary network between micro-particulates (e.g., added micro-particulates and micro-particulates native to a nut butter), syrup, and fat (e.g., structuring fat and fat native to a nut butter) formed when ingredients are combined in particular amounts with sufficient shear.

As used herein, the term "shelf-stable" refers to a food or food component (e.g., continuous component) that has a substantially stable structure, flavor, odor, and texture when stored at room temperature for at least 1 month (e.g., 3 months to 1 year, or 6 months to 10 months) at room temperature. That is, a shelf-stable food or food component provided herein does not exhibit substantial flavor or odor changes (e.g., due to oxidation), texture (e.g., due to oil separation or drying out), or structure (e.g., due to deformation in the absence of applied force and/or high temperatures) during a shelf life of at least 1 month at room temperature.

A shelf stable food composition provided herein includes a continuous component in an amount of at least 40% (e.g., 40% to 100%, 40% to about 80%, or 40% to about 70%) by weight of the shelf stable food composition.

A continuous component includes a nut butter in an amount of from about 20% to about 50% (e.g., about 30% to about 45%) by weight of the continuous component.

As used herein, the term "nut butter" refers to a paste made from a nut, legume, or seed, typically a roasted nut, legume, or seed, that includes all of the native components of the nut, legume, or seed (e.g., protein, fiber, starch, fat, sugar, and the like), and excluding components that are not native to the nut, legume, or seed. In some cases, a salt and/or sweetener (e.g., sugar, plant extract, or sugar alcohol) can be added to a nut butter before adding the nut butter to a continuous component described herein. In some embodiments, micro-particulates native to a nut butter (e.g., protein, fiber, starch, and the like) can have a particle size where at least 90% of the native micro-particulates are less than 150 μm (e.g., at least 70% from about 1 μm to about 80 μm, or at least 80% from about 2 μm to about 60 μm). Any suitable nut butter can be used, such as peanut butter, almond butter, sunflower seed butter, cashew butter, and the like.

A continuous component described herein includes a structuring fat in an amount of about 2% to about 35% (e.g., about 3% to about 30%, or about 5% to about 20%) by weight of the continuous component. As used herein, a "structuring fat" refers to an edible fat that is added to a continuous component and is not native to a nut butter. A structuring fat can contribute to a stable structure of a continuous component during production and shelf life of the continuous component.

Any edible fat or combination of fats can be used, including fats that are solid at room temperature (e.g., coconut oil, palm oil, palm kernel oil, palm stearin, lard, shortenings, fully hydrogenated oils, and the like, or any combination thereof), and fats that are liquid at room temperature (e.g., canola oil, peanut oil, almond oil, algae oil, corn oil, and the like, or any combination thereof). Preferably a structuring fat contains at least 50% (i.e., 50% to 100%) by weight of the structuring fat of a fat that is solid at room temperature. In some embodiments, a structuring fat can have a melting point that is less than 100° F. (e.g., about 70° F. to about 90° F., or about 75° F. to about 85° F.). However, it is to be understood that individual fats that comprise a structuring fat can melt at a higher or lower temperature than the structuring fat. Surprisingly, even if a structuring fat has a melting temperature of less than 100° F., a continuous phase or a food containing a continuous phase described herein is resistant to deformation and separation of oil using a temperature abuse test described in Example 1, even at temperatures exceeding 100° F. This is particularly surprising, since it would be assumed that a structuring fat that is not in crystalline form (i.e., below its melting point) would no longer be able to contribute to a stable structure and begin to migrate out of a food composition. That is not the case in the novel food composition described herein.

A continuous component described herein includes a syrup in an amount of about 15% to about 45% (e.g., about 30% to about 40%) by weight of the continuous component. As used herein, a "syrup" refers to a liquid carbohydrate ingredient, where the carbohydrate can be a fiber, a sugar, a sugar alcohol, or the like, or any combination thereof. As with a structuring fat, a syrup can contribute to a stable structure of a continuous component during production and shelf life of the continuous component. In addition, a syrup can contribute to a creamy mouthfeel, especially at the higher end of the operable range. Suitable syrups include, for example, honey, glycerol, liquid inulin, corn syrup, tapioca syrup, allulose syrup, molasses, and the like, or any combination thereof.

In some embodiments, a continuous component can have a total fat content of 30% or less, where the total fat content includes fat native to a nut butter included in the continuous component and structuring fat.

A continuous component also contains added micro-particulates in an amount of about 3% to about 25% (e.g., about 5% to about 20%, or about 8% to about 15%) by weight of the continuous component. As used herein, "added micro-particulates" refer to edible particulates that are not native to a nut butter, where at least 90% of the added micro-particulates have a particle size of less than 150 μm (e.g., at least 80% from 1 μm to 150 μm, or at least 80% 2 μm to 150 μm). Suitable added micro-particulates can be provided by powdered ingredients, such as protein powder (e.g., whey protein, calcium caseinate, sodium caseinate, soy protein, pea protein, and the like, or any combination thereof), starches, flour (e.g., grain flours, nut flours, seed flours, and the like, or any combination thereof), insoluble fibers, and the like, or any combination thereof. Preferably, micro-particulates have low solubility such that they do not significantly dissolve when combined with other ingredients of a continuous component.

In some embodiments, a continuous component can contain additional ingredients in an amount of up to 8% (e.g., up to 5%). Such ingredients can include, for example, salts, flavorant extracts (e.g., vanilla, almond extract, and the like), spices (e.g., cinnamon, nutmeg, and the like), non-syrup sweeteners (e.g., sugar, *stevia* extract, sugar alcohols, and the like), colorants, or any combination thereof.

In some embodiments, a shelf stable food composition provided herein can include a macro-particulate component in an amount of up to 60% (e.g., from about 10% up to 60%, or about 30% up to 60%) by weight of the shelf stable food composition. A macro-particulate component included in an amount greater than 60% by weight of a shelf stable food composition can result in reduced creaminess contributed by the continuous component.

As used herein, a "macro-particulate component" refers to one or a combination of edible particulates, where at least 80% of the particulates have a particle size greater than 500 μm (e.g., 80% greater than 1 mm, or at least 50% greater than 2 mm). Any suitable particulates can be included in a macro-particulate component, including without limitation, nuts or nut pieces, seeds or seed pieces, dried fruit, coconut pieces, chocolate pieces, confections, and the like, or any combination thereof. In some embodiments, particulates included in a macro-particulate component can be selected to provide a desired combination of flavors and/or textures. For example, nut pieces can provide nutty flavor and crunch, while dried fruit can provide chewiness, fruit flavor, and sweetness.

A shelf stable food composition provided herein can be in any suitable form, such as a snack bar, snack bites, a chewy cookie, or the like. For example, in some embodiments, a shelf stable food composition provided herein can be in the form that resembles a chewy granola type snack bar with a continuous component binding a macro-particulate component of nuts and seeds together. In some embodiments, a shelf stable food composition can include a fat- or sugar-based coating. For example, a shelf stable food composition can include a continuous phase with or without a macro-particulate component coated with a compound coating to form a snack bar or snack bites.

In some embodiments, a shelf stable food composition provided herein can be formulated to be suitable for specialized diets, such as a ketogenic diet or a diabetic diet.

A shelf stable food composition can be packaged using any suitable packaging material or form to produce a packaged food product. For example, a shelf stable food composition in the form of a snack bar can be individually packaged to be sold alone or in a pack of several individually packaged snack bars. In another example, compound coated continuous component in the form of snack bites can be packaged in a multi-piece packaging to be sold as a convenient snackable product.

A method of making a shelf stable food composition includes combining ingredients in amounts described above, including a nut butter, a structuring fat, a syrup, and added micro-particulates, and applying sufficient shear to form a continuous component. As used herein, "sufficient shear" refers to an amount of shear that results in homogenous integration of each ingredient in a continuous component, such that substantially no dry spots or oil separation is visible to the naked eye. Once sufficient shear has been reached, further shear can result in separation of oil from the other ingredients in a continuous component and agglomeration of the other ingredients that are resistant to re-integration.

In some embodiments, a method of making a shelf stable food composition can be done in a batch process (e.g., in a batch mixer). A batch process for making a shelf stable food composition can flexibly allow combination of ingredients. However, in some embodiments of a batch process of making a shelf stable food composition where a macro-particulate component is included, it is beneficial to combine added micro-particulates with the macro-particulate component prior to adding a nut butter, structuring fat, and syrup. This conveniently allows dry ingredients to be mixed well before being introduced to the liquid ingredients.

In some embodiments, a method of making a shelf stable food composition can be done in a continuous process (e.g., in an extruder). In some embodiments, a continuous process for making a shelf stable food composition can benefit from adding added micro-particulates with nut butter and structuring fat before adding a syrup. This order of addition conveniently provides a larger range of sufficient shear before oil begins to separate from a continuous component. A continuous process for making a shelf stable food composition can also benefit from adding a macro-particulate component after all ingredients in a continuous component have been initially combined. It is to be understood, however, that shear introduced when combining a macro-particulate component can contribute to sufficient shear, so it is not necessary for the continuous component to be fully formed prior to adding the macro-particulate component.

Preferably, a structuring fat is in liquid form (i.e., at a temperature at or above its melting point) prior to adding it to other ingredients. For example, a structuring fat can be melted and held at a temperature of from about 75° F. to about 85° F. (e.g., about 80° F.) prior to being added to other ingredients. This can facilitate homogenous incorporation of a structuring fat within a continuous component, and allow it to participate in the structure of the continuous component. In some embodiments, a shelf stable food composition can be kept at a temperature at or above the melting point of a structuring fat until the shelf stable food composition is formed into pieces, and then allowed to cool. That is, a shelf stable food composition can be held at or above the melting point of a structuring fat through combination and sufficient shear. This can ensure that the shelf stable food can be more readily formed without disrupting its structure during formation.

A method for making a shelf stable food composition can include forming the shelf stable food composition into pieces. Any method of formation can be used. For example, a shelf stable food composition can be extruded into pieces, formed into a sheet and cut, rolled into balls, or the like. Pieces of a shelf stable food composition can be packaged using known methods.

The following examples are provided to show selected embodiments of the invention described herein. The examples are not intended to limit the invention to any particular embodiment.

EXAMPLES

Example 1—Formulation

Peanut butter- and almond butter-based shelf stable food compositions were made with ingredients as shown in Table 1. The structuring fat was a combination of a vegetable shortening and a palm oil. The added micro-particulates included a combination of calcium caseinate and whey protein isolate, as well as peanut flour for the peanut version. The syrup included a combination of glycerin and sugar syrups. The macro-particulate component included one or more nuts, seeds, dried fruit, coconut, granola, and puffed grain. Each of the formulations was tested using both a continuous and batch process to produce a shelf stable snack bar that had a creamy mouthfeel from the continuous component, as well as crunch and chewiness from the macro-particulate component. Neither formulation experienced significant oil separation during a tested shelf life of 8 months, nor was significant flavor, odor, or texture change detected upon consumption.

TABLE 1

| Version | Nut butter amount % wt continuous component | Structuring fat % wt continuous component | Syrup % wt continuous component | Added micro-particulates % wt continuous component | Macro-particulates % total weight |
|---|---|---|---|---|---|
| Peanut butter | 40-45 | 5-10 | 35-45 | 8-12 | 50-60 |
| Almond butter | 32-37 | 15-20 | 30-40 | 7-11 | 45-55 |

Each bar version was tested for stability during temperature abuse. To test stability, individual bars packaged in pouches were placed in cartons with multiple bars in each carton. Cartons of each sample were stored at each of the conditions in Table 2, then immediately placed on a vibrating table for 1 hour. The samples were allowed to reach room temperature after shaking and before bars were taken out of pouches to determine the stability of the bar based on whether oil separated from the product or the product experienced any deformation. Both versions were surprisingly stable, with the almond version being slightly more prone to oil separation at conditions at or above 100° F.

TABLE 2

| Condition | Description | Notes |
|---|---|---|
| 1 | 70° F. 24 hours | Control |
| 2 | 90° F. 24 hours | Similar to warehouse conditions or typical for pallet on truck |
| 6 | 100° F. 24 hrs | Similar to conditions for an outer cube for 4 days in typical summer truck |
| 7 | 113° F. 4 hrs | Similar to conditions for an outer cube for 1 day in a stationary hot truck on a very hot day |

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A shelf-stable food composition, comprising:
 a. a continuous component in an amount of at least 40% by weight of the shelf-stable food composition, the continuous component having a creamy and pliable texture and including:
  i. a nut butter in an amount of about 20% to about 50% by weight of the continuous component;
  ii. a structuring fat in an amount of about 2% to about 35% by weight of the continuous component;
  iii. a syrup in an amount of about 15% to about 45% by weight of the continuous component; and
  iv. added micro-particulates in an amount of about 3% to about 25% by weight of the continuous component, at least 90% of the added micro-particulates having a particle size of less than 150 μm; and
 b. a macro-particulate component in an amount of up to 60% by weight of the food composition, the macro-particulate component suspended within the continuous component to provide the shelf-stable composition with contrasting chewy and crunchy textures, wherein the shelf-stable food composition is shelf-stable at room temperature for at least 1 month,
 wherein the continuous component is configured to develop a capillary network between the nut butter, the structuring fat, the syrup and the added micro-particulates.

2. The shelf-stable food composition of claim 1, wherein the continuous component is included in an amount of 40% to 70% by weight of the shelf-stable food, and the macro-particulate component is included in an amount of 30% to 60% by weight of the shelf-stable food composition.

3. The shelf-stable food composition of claim 2, wherein the food composition is a snack bar.

4. The shelf stable food composition of claim 1, wherein the nut butter is included in an amount of about 30% to about 45% by weight of the continuous component.

5. The shelf-stable food composition of claim 1, wherein the structuring fat includes a liquid oil in an amount of up to 50% by weight of the structuring fat.

6. The shelf-stable food composition of claim 1, wherein the continuous component has a total fat content of no higher than 30% by weight of the continuous component, wherein the total fat content comprises the structuring fat and a nut butter fat content.

7. The shelf-stable food composition of claim 1, wherein the added micro-particulates comprise a protein, a flour, or a starch.

8. The shelf-stable food composition of claim 1, wherein the added micro-particulates comprise a protein comprising a caseinate protein or a whey protein.

9. The shelf-stable food composition of claim 1, wherein the syrup comprises glycerol, allulose, honey, or tapioca syrup.

10. The shelf-stable food composition of claim 1, wherein the shelf-stable food composition further comprises a fat-based or sugar-based coating.

11. A packaged food product, comprising the shelf-stable food composition of claim 1 inside a package.

12. A method of making a shelf-stable food composition, comprising:
 a. combining ingredients to produce a continuous component having a creamy and pliable texture, the ingredients including:

i. a nut butter in an amount of about 20% to about 50% by weight of the continuous component;
  ii. a structuring fat in an amount of about 2% to about 25% by weight of the continuous product;
  iii. a syrup in an amount of about 15% to about 45% by weight of the continuous component; and
  iv. added micro-particulates in an amount of about 3% to about 10% by weight of the continuous component, at least 90% of the added micro-particulates having a particle size of less than 150 µm; and
b. combining the continuous component with a macro-particulate component and applying sufficient shear to the ingredients to homogeneously integrate each of the ingredients into the continuous component to make the shelf-stable food composition with contrasting chewy and crunchy textures, wherein the shelf-stable food composition is shelf-stable at room temperature for at least 1 month,
  wherein the continuous component is configured to develop a capillary network between the nut butter, the structuring fat, the syrup and the added micro-particulates.

13. The method of claim 12, wherein the ingredients are combined in a batch process.

14. The method of claim 12, wherein the ingredients are combined in a continuous process.

15. The method of claim 14, further comprising combining the added micro-particulates with the nut butter and the structuring fat prior to adding the syrup.

16. The method of claim 12, further comprising melting the structuring fat prior to combining the ingredients.

17. The method of claim 12, further comprising maintaining the ingredients at a temperature at or above a melting point of the structuring fat during the steps of combining the ingredients and applying shear.

18. The method of claim 12, further comprising forming the shelf-stable food composition into pieces.

19. The method of claim 18, further comprising packaging the pieces to produce a packaged food product.

\* \* \* \* \*